United States Patent
Cheng et al.

(10) Patent No.: US 11,163,748 B1
(45) Date of Patent: Nov. 2, 2021

(54) FINGERPRINT BACKWARD COMPATIBILITY IN DEDUPLICATION BACKUP SYSTEMS

(71) Applicant: Veritas Technologies LLC, Mountain View, CA (US)

(72) Inventors: Shuai Cheng, Beijing (CN); Xianbo Zhang, Plymouth, MN (US); Cheng Shan, Beijing (CN); Chunzhong Zhang, Beijing (CN); Jinchang Zhang, Beijing (CN); Wen Feng Jiang, Beijing (CN); Dongxu Sun, Beijing (CN); Xinbao Jin, Beijing (CN)

(73) Assignee: Veritas Technologies LLC, Santa Clara, CA (US)

( * ) Notice: Subject to any disclaimer, the term of this patent is extended or adjusted under 35 U.S.C. 154(b) by 206 days.

(21) Appl. No.: 15/798,540

(22) Filed: Oct. 31, 2017

(51) Int. Cl.
  *G06F 16/23* (2019.01)
  *G06F 16/21* (2019.01)
  *H04L 9/06* (2006.01)

(52) U.S. Cl.
  CPC ........ *G06F 16/2365* (2019.01); *G06F 16/213* (2019.01); *H04L 9/0643* (2013.01)

(58) Field of Classification Search
  CPC ............. G06F 11/1453; G06F 11/1451; G06F 16/1748; G06F 16/137
  See application file for complete search history.

(56) References Cited

U.S. PATENT DOCUMENTS

| | | | | |
|---|---|---|---|---|
| 7,814,149 B1* | 10/2010 | Stringham | .......... | G06F 16/1748 709/203 |
| 8,775,377 B1* | 7/2014 | Zhang | ..................... | G06F 17/00 707/610 |
| 9,442,807 B1* | 9/2016 | Zhang | ................. | G06F 16/1752 |
| 10,007,795 B1* | 6/2018 | Chung | .................... | G06F 21/62 |
| 2002/0126872 A1* | 9/2002 | Brunk | ................ | G06K 9/00744 382/100 |
| 2017/0180394 A1* | 6/2017 | Crofton | ................. | H04L 63/145 |

* cited by examiner

*Primary Examiner* — Apu M Mofiz
*Assistant Examiner* — Cindy Nguyen
(74) *Attorney, Agent, or Firm* — Campbell Stephenson LLP

(57) ABSTRACT

Disclosed herein are methods, systems, and processes to optimize and manage fingerprint backward compatibility in deduplication backup computing systems. A new fingerprint is generated for a segment object stored in a data container based on a new fingerprinting process. A header file is modified by replacing an old fingerprint for the segment object based on an old fingerprinting process with the new fingerprint. An entry including information indicating an association between the old fingerprint and the new fingerprint is created in a fingerprint map file.

20 Claims, 9 Drawing Sheets

US 11,163,748 B1

FINGERPRINT BACKWARD COMPATIBILITY IN DEDUPLICATION BACKUP SYSTEMS

FIELD OF THE DISCLOSURE

The present disclosure relates to deduplication backup systems. In particular, the present disclosure relates to fingerprint backward compatibility in deduplication backup system.

DESCRIPTION OF THE RELATED ART

A fingerprinting algorithm is an algorithm that maps a data segment to a typically shorter string of bits. A fingerprint uniquely identifies the data segment and is typically used to avoid the comparison and transmission of bulky data. For example, a web browser or proxy server can check whether a file has been modified, by fetching only the file's fingerprint and comparing the fetched fingerprint with a previously-fetched copy. Therefore, a fingerprint may be used for data deduplication (e.g., in deduplication backup systems).

An example of a fingerprint is a hash value. Hashing algorithms such as Message-Digest Algorithm 5 (MD5), Secure Hash Algorithm 1 (SHA-1), and Secure Hash Algorithm 256 (SHA-256), and the like can be used to generate hash values. Unfortunately, a fingerprinting algorithm can be identified and therefore, may have to be replaced with another hash value generated using an alternate fingerprinting algorithm to preserve the security and integrity of backed up data. As a result, deduplication backup systems can be configured where data segments associated with an old (replaced) fingerprinting algorithm are typically regenerated based on a new (different) fingerprinting algorithm (e.g., to become FIPS (Federal Information Processing Standard) compliant, for secure deduplication, cybersecurity reasons, and the like).

Deduplication backup systems can be configured to perform data deduplication (or more simply, deduplication), which is a process that eliminates redundant copies of data and reduces storage overhead. Deduplication ensures that only one unique instance of data is retained on a storage device. Redundant data blocks are replaced with a pointer to the unique data copy. Source-based deduplication (also called client-side deduplication) removes redundant blocks before transmitting data to a backup target such as a storage device. Performing deduplication at the source reduces bandwidth and storage use.

Deduplication involves linking multiple references to the same data content. Although each data segment may be referenced by more than one backup image, storage reclamation can remove data segments if associated backups have expired. For example, free space in the storage device (e.g., data containers) can be compacted to reclaim storage space newly made available, for example, as a result of deduplication.

In complex deduplication computing environments implemented with multiple disparate clients, servers, storage systems, and other computing, storage, and/or networking devices, a deduplication storage server can be upgraded to support a new fingerprinting process although certain clients may still generate data items for backup generated using an old fingerprinting process (e.g., because such clients may have not been upgraded to support the new fingerprinting process, among other reasons). In such situations, deduplication backup systems run the risk of a sudden and significant drop in deduplication rate (e.g., because of the unavailability of indexing for fingerprints generated using the old fingerprinting process on the deduplication storage server, among other issues).

SUMMARY OF THE DISCLOSURE

Disclosed herein are methods, systems, and processes to optimize and manage fingerprint backward compatibility in deduplication backup computing systems. One such method involves generating a new fingerprint for a segment object, where the segment object is stored in a data container, and the new fingerprint is generated based on a new fingerprinting process, modifying a header file by replacing an old fingerprint for the segment object with the new fingerprint, where the old fingerprint is based on an old fingerprinting process, and creating an entry in a fingerprint map file, where the entry comprises information indicating an association between the old fingerprint and the new fingerprint.

In one embodiment, the method receives a request for one or more data segments, where the one or more data segments are part of a data object, and the data object references the old fingerprint and searches the fingerprint map file to locate the one or more data segments in a deduplicated backup storage device. In this example, the data container includes the header file, a data file associated with the segment object, and the fingerprint map file, the data object is part of a backup image or a previous backup image, and the backup image, the previous backup image, and the data container are stored on the deduplicated backup storage device. In another embodiment, the method determines that a deduplication server includes one or more binaries that support the new fingerprinting process and converts one or more data containers storing the one or more data segments from the old fingerprint to the new fingerprint.

In some embodiments, the method receives a backup request from an old client computing device, where the old client computing device is configured to use the old fingerprinting process, and the backup request includes at least one data segment that references a fingerprint generated using the old fingerprinting process, generates another fingerprint for the at least one data segment based on the new fingerprinting process, searches for the another fingerprint in a fingerprint indexing cache, inhibits inclusion of the at least one data segment in the backup request if the another fingerprint is found in the fingerprint indexing cache, and includes the at least one data segment in the backup request if the another fingerprint is not found in the fingerprint indexing cache.

In other embodiments, the method determines that a new client computing device previously configured to use the old fingerprinting process has been configured to use the new fingerprinting process, receives another backup request from the new client computing device, where the another backup request comprises at least another data segment, and the another backup request is received after the new client computing device has been configured to utilize the new fingerprinting process, generates a first fingerprint for the at least another data segment based on the old fingerprinting process, and generates a second fingerprint for the at least another data segment based on the new fingerprinting process.

In certain embodiments, the method performs a deduplication operation, where the deduplication operation is performed using the first fingerprint, the first fingerprint locates one or more redundant data blocks in the at least another data segment in a last backup image cache, and the last backup image cache is associated with the previous backup image and creates another entry in the fingerprint map file, where the another entry indicates another association between the first fingerprint and the second fingerprint after completion of the another backup request.

In one embodiment, the method receives a restore request to restore the backup image, where the backup image comprises one or more data objects, and the one or more data objects include one or more fingerprints generated using the old fingerprinting process, accesses the fingerprint map file, searches the fingerprint map file for the one or more fingerprints, retrieves one or more corresponding fingerprints generated using the new fingerprinting process, reads the one or more data objects based on the one or more corresponding fingerprints, and restores the one or more data objects as part of performing the restore request.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1:
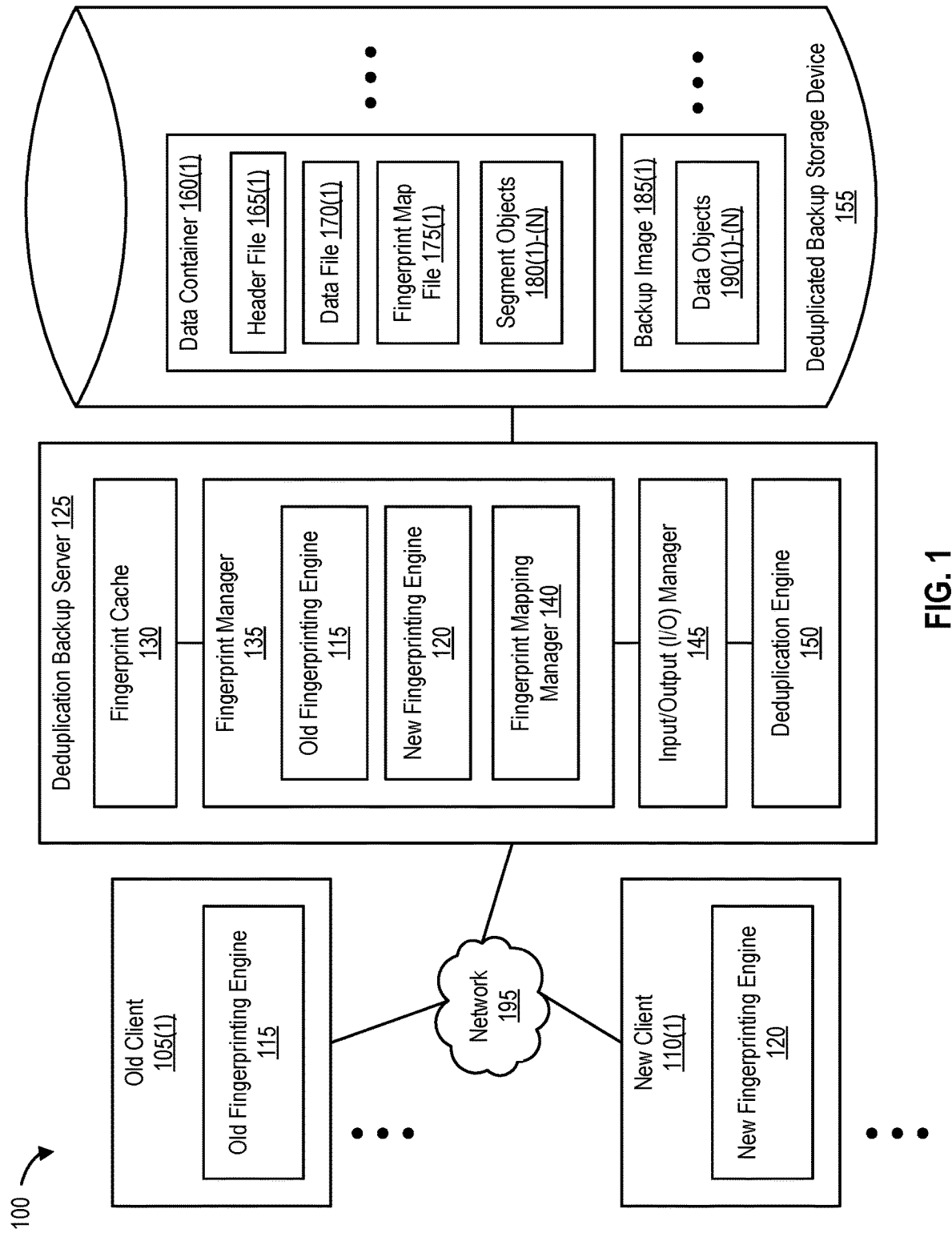
FIG. 1 is a block diagram 100 and illustrates a deduplication backup computing environment, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A fingerprinting process uses an algorithm that maps a larger data item (e.g., a computer file, data segment, or other unit of data) to a smaller value. The smaller value is sometimes referred a "hash value" of the data item (e.g., in the case of a deduplication backup storage system, a "fingerprint"). The hash value identifies the data item in a significantly unique manner During a backup, clients and/or computing systems can duplicate data within a set of data to be backed up. In addition, if a set of data is backed up multiple times, data that is unchanged or unmodified also results in duplicates of previously backed up data.

As previously noted, in order to prevent backing up duplicate data from one or more client devices, backup systems can implement deduplication, which is a process for removing duplicate and/or redundant copies of data from a storage device. Deduplication preserves storage space when backing up data from client systems (e.g., using client-side or source-side deduplication). Because deduplication ensures that only one unique instance of data is retained on a storage device, deduplication reduces bandwidth and storage use.

Hash values or fingerprints may be used for deduplication purposes to avoid the need for comparison and transmission of excessive amounts of data. For example, deduplication backup servers can check whether a file has been modified by retrieving only the file's hash value (instead of the entire file), and comparing the retrieved hash value with that of a previously-retrieved copy of the file. Thus, matching hash values, or portions of hash values, in such a situation obviates the need to transfer the files. A hash value can also be a value generated for a given data segment. Typically, such hash values are unique to each data segment, and thus distinguish data segments from one another. A hash value is an example implementation of a fingerprint. For example, hashing algorithms (also called fingerprinting algorithms or fingerprinting processes) such as Rabin's Algorithm, Message-Digest Algorithm 5 (MD5), and Secure Hash Algorithm 256 (SHA256), and the like, can be used to generate hash values.

Unfortunately, even the most secure hashing algorithm may be deciphered, for example, by a hacker and/or intruder. For example, the cryptographic weakness of certain fingerprinting processes render fingerprints generated with such fingerprinting processes FIPS (Federal Information Processing Standard) uncompliant (e.g., MD5, among others). Therefore, companies typically change the hashing/fingerprinting algorithm of a fingerprinting process from time to time to make it harder for a hacker and/or intruder to decipher and/or identify the hash values generated by the existing (old) fingerprinting process. However, when an existing fingerprinting process is changed, the fingerprints of existing data segments associated with the fingerprinting process have to be regenerated based on a new fingerprinting process.

As previously noted, regenerating fingerprints of data segments in deduplication backup storage environments presents unique challenges. It will be appreciated that in such computing environments, a deduplication storage server can be upgraded to support the new fingerprinting process while certain clients may still generate data items for backup generated using the old fingerprinting process (e.g., because such clients may have not been upgraded to support the new fingerprinting process, among other reasons). In such situations, deduplication backup systems run the risk of a sudden and significant drop in deduplication rate (e.g., because of the unavailability of indexing for fingerprints generated using the old fingerprinting process on the deduplication storage server, among other issues).

Therefore, managing fingerprint backward compatibility in deduplication backup storage systems is important (e.g., managing data items identified by old fingerprints when the deduplication backup server is upgraded to support new fingerprints, handing backward compatibility when an old client with old fingerprints communicates with the deduplication backup server upgraded to support new fingerprints, avoiding a deduplication rate drop when switching between old and new fingerprint processes, and configuring a storage device to maintain only new fingerprints to meet FIPS requirements, among other reasons).

Disclosed herein are methods, systems, and processes to optimize and manage fingerprint backward compatibility in deduplication backup storage systems.

Example Deduplication Backup Storage System

FIG. 1 is a block diagram 100 and illustrates a deduplication backup computing environment, according to one embodiment. As shown in FIG. 1, such a deduplication backup computing environments includes at least one or more old clients (e.g., old clients 105(1)-(N)), one or more new clients (e.g., new clients 110(1)-(N)), a deduplication backup server 125, and a deduplicated backup storage device 155. Old client 105(1), new client 110(1), and deduplication backup server 125 can be any of a variety of different types of computing devices, including a server, personal computing device, laptop computer, net book, personal digital assistant, cellular phone, or the like.

Deduplicated backup storage device 155 can include one or more of a variety of different storage devices, including hard disks, compact discs, digital versatile discs, one or more solid state drives (SSDs) memory such as Flash memory, and the like, or one or more logical storage devices such as volumes implemented on one or more such physical storage devices. Old client 105(1), new client 110(1), deduplication backup server 125, and deduplicated backup storage device 155 are communicatively coupled via network 195. Any type of network and/or interconnection (e.g., the Internet, and the like) can be used to facilitate communication between old client 105(1), new client 110(1), deduplication backup server 125, and deduplicated backup storage device 155.

Old client 105(1) includes an old fingerprinting engine 115. In this example, old client 105(1) is a computing device that generates backup data for deduplication backup server 125, where fingerprints for data segments are generated using an old fingerprinting process (e.g., MD5, a fingerprinting process that has yet to be upgraded in the old client, a FIPS-uncompliant fingerprinting process, an undesirable fingerprinting process, and the like). On the contrary, new client 110(1) includes a new fingerprinting engine 120. In this example, new client 110(1) is a computing device that generates backup data for deduplication backup server 125, where fingerprints for data segments are generated using a new fingerprinting process (e.g., SHA256, a FIPS-complaint fingerprinting process, a different fingerprinting process, and the like).

Deduplication backup server 125 implements at least a fingerprint cache 130, a fingerprint manager 135, an input/output (I/O) manager 145, and a deduplication engine 150. Fingerprint manager 135 further implements at least old fingerprinting engine 115, new fingerprinting engine 120, and a fingerprint mapping manager 140. Fingerprinting mapping manager 140 tracks and manages fingerprint mapping between old and new fingerprints for data segments that are intended for deduplication backup operations performed by deduplication engine 150. I/O manager 145 manages I/Os (e.g., reads and writes) generated by old client 105(1) and new client 110(1). In some examples, old fingerprinting engine 115 generates MD5 fingerprints and new fingerprinting engine 120 generates SHA256 fingerprints (e.g., for data segments and/or data items). In other examples, old fingerprinting engine 115 generates MD4 fingerprints and new fingerprinting engine 120 generates SHA512 fingerprints (e.g., for data segments and/or data items). Therefore, old fingerprinting engine 115 and new fingerprinting engine 120 generate fingerprints for data segments using different fingerprinting processes.

Deduplicated backup storage device 155 includes one or more data containers (e.g., data container 160(1)-(N)) and one or more backup images (e.g., backup images 185(1)-(N)). In this example, deduplication backup server 125 implements a media server deduplication pool (MSDP), and deduplicated backup storage 115 maintains a data container (e.g., data container 160(1)) that includes at least a header file 165(1) (e.g. *.hdr), a data file 170(1) (e.g., *.bin), a fingerprint map file 175(1) (e.g., *.map), and segment objects 180(1)-(N). Backup image 185(1) includes data objects 190(1)-(N).

Deduplication engine 150 implements a deduplication pool (e.g., disk storage like deduplicated backup storage device 155 that is attached to deduplication backup server 125) and can include a catalog that maintains metadata information regarding one or more deduplication backup operations (e.g., the identify and location of deduplicated data, and the like), as well as a reference database that maintains information about the deduplicated data (e.g., pointer information, reference information, and other such metadata). I/O manager 145 can maintain a reference list that includes one or more data container identifiers (e.g., to identify data container 160(1) stored in deduplicated backup storage device 155).

Data objects 190(1)-(N) are a representation of data that is stored on deduplicated backup storage device 155. Data is typically stored in data blocks (or more simply, blocks). One block corresponds to a specific number of bytes of physical storage space on disk. An extent is a specific number of contiguous blocks. A data segment (or more simply, segment) is a set of extents, and thus, a set of blocks. A block can be associated with multiple segments, especially if that block has been deduplicated and the block is referenced by different segments on different backup images. Therefore, a given data object like data object 190(1) can be associated with (and referenced by) multiple segment object fingerprints. For example, segment object fingerprints associated with segment objects 180(1)-(N) are referenced by one or more data objects stored on deduplicated backup storage device 155.

Example Deduplication Engine and Fingerprint Cache

Figure 2:
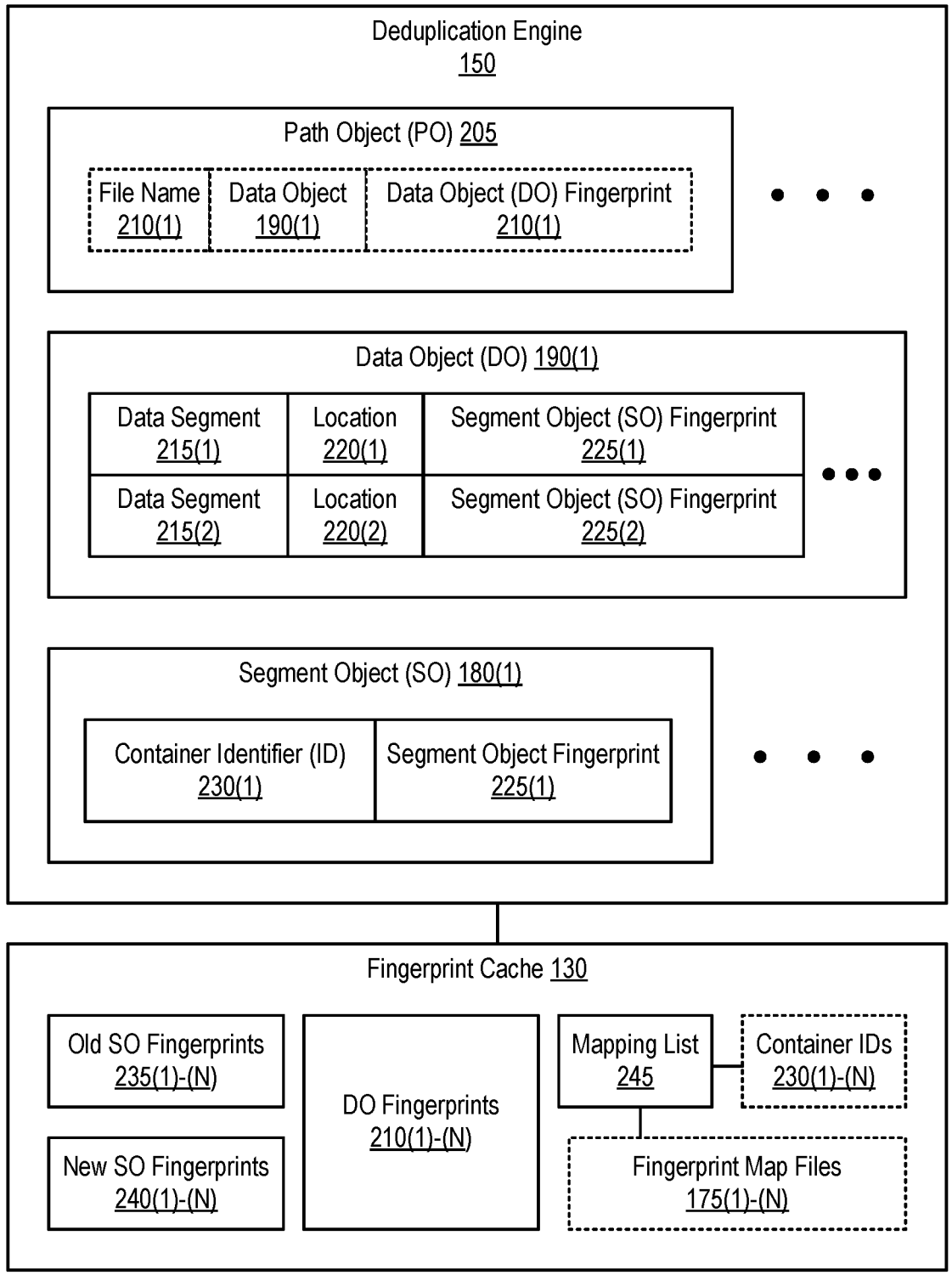
FIG. 2 is a block diagram 200 and illustrates a deduplication backup server, according to one embodiment of the present disclosure.

FIG. 2 is a block diagram 200 and illustrates a deduplication backup server that implements a deduplication engine and a fingerprint cache, according to one embodiment. In certain embodiments, and as shown in FIG. 2, deduplication engine 150 includes at least a path object (PO) 205, a data object (DO) 190(1), and a segment object (SO) 180(1). PO 205 includes mapping information (e.g., a file name 210(1), DO 190(1), and a data object (DO) fingerprint 210(1)). A path object in a deduplication pool (e.g., PO 205) maintains a mapping between a file name and a data object represented by a (given) fingerprint (e.g., a data object fingerprint like DO fingerprint 210(1)). DO 190(1) includes data segments (e.g., data segments 215(1), 215(2), and the like), location information for data segments (e.g., location 220(1) of data segment 215(1), location 220(2) of data segment 215(2), and the like), and segment object (SO) fingerprints (e.g., SO fingerprint 225(1) of data segment 215(1), SO fingerprint 225(2) of data segment 215(2), and the like). A data object contains the fingerprint and location information of data segments composing the data object. A data segment is stored in a container. SO 180(1) includes container identifiers (e.g., container identifier 230(1) and SO fingerprints (e.g., SO fingerprint 225(1)). A segment object (SO) is uniquely identified by a SO fingerprint (or simply, fingerprint) and a container identifier. Deduplication backup server 125 also maintains fingerprint cache 130.

Fingerprint cache 130 maintains old SO fingerprints 235(1)-(N) (e.g., fingerprints for data segments generated using old fingerprinting engine 115) and new SO fingerprints 240(1)-(N) (e.g., fingerprints for data segments generated using new fingerprinting engine 120). Fingerprint cache also maintains DO fingerprints 210(1)-(N). It should be noted that path objects and data objects are metadata for a given backup image and are removed from deduplicated backup storage device 155 once the backup image expires. Therefore, unlike fingerprints for data segments, fingerprints for data objects do not have to be regenerated. Fingerprint cache 130 also maintain a mapping list 245, container IDs 230(1)-(N), and fingerprint map files 175(1)-(N)).

Examples of Providing Fingerprint Backward Compatibility

Figure 3A:
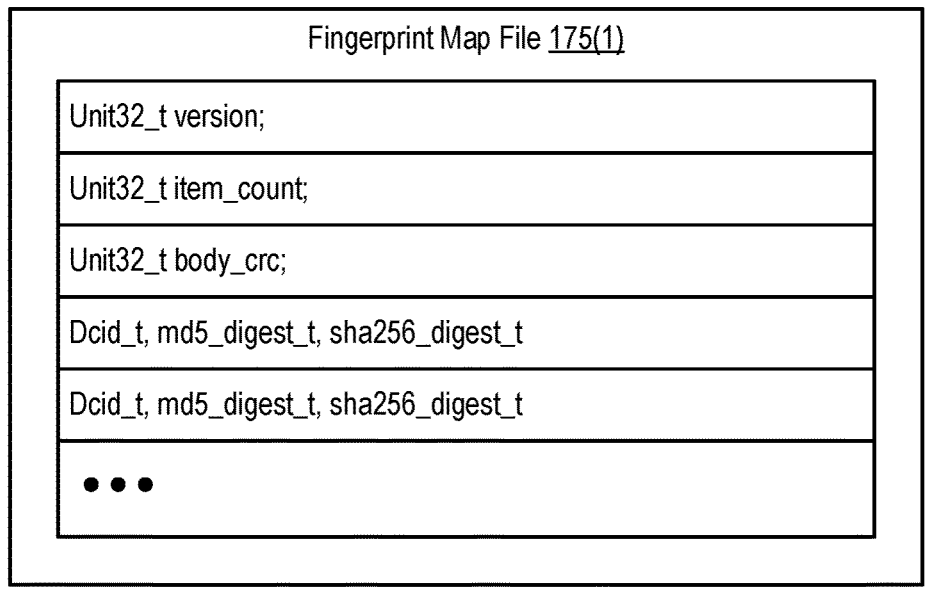
FIG. 3A is a block diagram 300A and illustrates a fingerprint map file, according to one embodiment of the present disclosure.

FIG. 3A is a block diagram 300A and illustrates a fingerprint map file, according to one embodiment. Fingerprint map file 175(1) is maintained in data container 160(1)). In one embodiment, new fingerprinting engine 120 generates a new fingerprint for a segment object (e.g., new SO fingerprint 240(1)) stored in data container 160(1) based on a new fingerprinting process (e.g., SHA256, and the like). In this example, fingerprint mapping manager 140 modifies header file 165(1) by replacing an old fingerprint for the segment object (e.g., old SO fingerprint 235(1)) based on an old fingerprinting process (e.g., MD5, and the like) with the new fingerprint, and creates an entry in fingerprint map file 175(1) that includes information indicating an association between the old fingerprint and the new fingerprint (e.g., Dcid_t, md5_digest_t, sha256_digest_t).

In some embodiments, deduplication backup server 125 receives a request for one or more data segments that are part of a data object that references the old fingerprint. Fingerprint manager 135 searches fingerprint map file 175(1) to locate the data segments in deduplicated backup storage device 155. Fingerprint manager 135 determines that deduplication backup server 125 includes one or more binaries that support a new fingerprinting process and converts one or more data containers storing the one or more data segments from the old fingerprint to the new fingerprint. For example, fingerprint manager 135 generates new (and alternate) fingerprints for the one or more data segments using new fingerprinting engine 120.

Figure 3B:
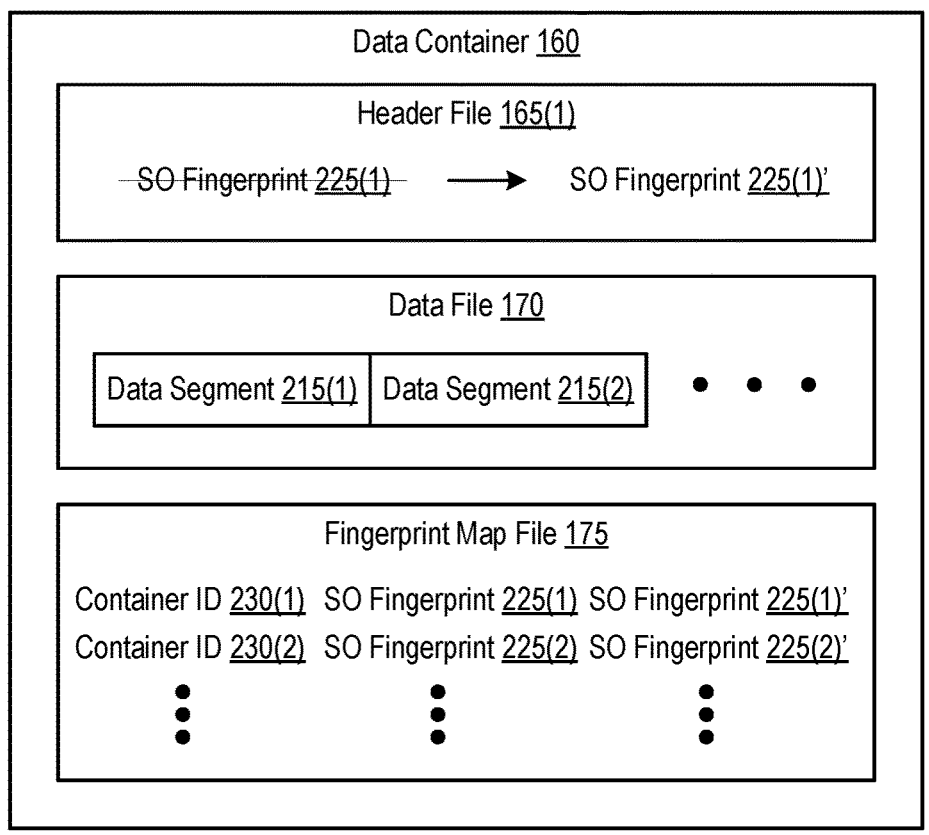
FIG. 3B is a block diagram 300B and illustrates a data container, according to one embodiment of the present disclosure.

FIG. 3B is a block diagram 300B and illustrates a data container, according to one embodiment. Data container 160 includes header file 165(1), data file 170, and fingerprint map file 175. As previously noted, fingerprint mapping manager 140 modifies header file 165(1) by replacing an old fingerprint for a segment object (e.g., SO fingerprint 225(1)) with a new fingerprint (e.g., SO fingerprint 225(1)'), and creates an entry in fingerprint map file 175 that includes information indicating an association between the old and new fingerprints (e.g., container ID 230(1) with SO fingerprint 225(1) and SO fingerprint 225(1)').

In certain embodiments, a segment object a user data block that is identified by an old fingerprint and is likely referenced by a new backup image. Therefore, to convert a (given) segment object (e.g., to generate a new fingerprint), deduplication backup server 125 reads segment object data (e.g., data segment(s)) and generates new fingerprints for those data segments (e.g., using new fingerprinting engine 120). Fingerprint manager 135 then updates the SO fingerprint in header file 165(1) and writes an old fingerprint to new fingerprint entry to fingerprint map file 175(1). In this manner, if deduplication engine 150 requires data with the old fingerprint (e.g., as part of a service request from old client 105(1)), deduplication engine 150 simply searches for the data in the fingerprint map file 175(1).

Examples of Configuring Deduplication Pool Storage to Support Old & New Fingerprints In a production computing environment, a deduplication backup server is typically upgraded before clients with respect to fingerprinting processes. Thus, upgrading multiple clients (e.g., thousands of old clients) may take days or weeks. Therefore, in one embodiment, after a deduplication backup server is upgraded to support a new (and different) type of fingerprinting process, new backup images only reference new fingerprints even if the backup is generated by and/or originates from an old client or a new client. The fingerprint mapping and/or conversion process implemented by fingerprint mapping manager 140 creates fingerprint map file 175(1) for data container 160(1) storing one or more data segments. In will be appreciated that fingerprint manager 135, in conjunction with fingerprint mapping engine 140 can provide fingerprint backward compatibility from the server side and from the distributed client-side.

To perform server side conversion, fingerprint manager 135 implements a background process that accesses a data container, reads data segments with old fingerprints, regenerates new fingerprints for those data segments, and creates a fingerprint map file that maps the old fingerprint to the new fingerprint. This process can be repeated for each data container stored in deduplicated backup storage device 155. To perform distributed client side conversion with a newly upgraded client (e.g., new client 110(1) that is upgrade to use and support new fingerprinting engine 120), fingerprint manager 135 receives old fingerprints from a previous (last) backup, generates both old and new fingerprints for a given data segment of the current (ongoing) backup, and performs deduplication (e.g., using deduplication engine 150) against the last backup using the old fingerprints. Unique data segments (e.g., new data segments) and existing data segments (e.g., old data segments) along with their corresponding old fingerprints and new fingerprints are sent to deduplication backup server 125 to be stored (e.g., the old and new data segments in a new backup image stored on deduplicated backup storage device 155, and the old and new fingerprints in fingerprint cache 130 (e.g., old SO fingerprints 235(1)-(N) and new SO fingerprints 240(1)-(N)).

For example, when a deduplication backup server is upgraded with new MSDP binaries that support a new fingerprinting process, background threads executed by fingerprint manager 135 generates new fingerprints for each old fingerprint associated with a given data segment. A working thread executed by fingerprint manager 135 in conjunction with fingerprint mapping manager 140 converts data containers storing data segments (e.g., from the newest data container to the oldest data container) by reading segment object data (e.g., from a .bin file) generating new fingerprints for those data segments, and updating a header file and a fingerprint map file. In some example, a checkpoint is periodically generated to ensure that when the deduplication pool is restarted (e.g., because of system crash, power outage, and the like), a working thread can resume the conversion operation from the checkpoint. Therefore, it will be appreciated that after the working thread completes the conversion operation and the data containers in deduplicated backup storage device 155 have been converted (e.g., thus identifying data segments by their new fingerprints), a new backup can reference a given data segment by the data segment's new fingerprint.

Examples of Managing Old Client Backups to Server with New Fingerprinting Process In some embodiments, if old client 105(1) sends a backup stream to deduplication backup server 125 that has been upgraded to support a new fingerprinting process with data segments generated using an old fingerprinting process, fingerprint manager 135 generates new fingerprints for those data segments using the new fingerprinting process. For example, if deduplication backup server 125 receives a data segment with an old fingerprint (e.g., an MD5 fingerprint), fingerprint manager 135 generates a new fingerprint (e.g., a SHA256 fingerprint) for the data segment. Fingerprint mapping manager 140 then searches for the newly generated new fingerprint from the new fingerprint indexing cache (e.g., maintained by fingerprint cache 130). If the new fingerprint is found in fingerprint cache 130, the data segment is discarded. If the new fingerprint is not found in fingerprint cache 130, the data segment is saved by deduplication engine 150 as new data.

In this manner, if deduplication backup server 125 receives a backup request that from old client 105(1) that is configured to use an old fingerprinting process and requests data segments that reference old fingerprints, new fingerprinting engine 120 generates another fingerprint for the data segment (e.g., a new fingerprint) based on a new fingerprinting process. Deduplication engine 150 then inhibits inclusion of the data segment in the backup request in the new fingerprint is found in a fingerprint indexing cache, and includes the data segment in the backup request if the new fingerprint is not found in the fingerprint indexing cache.

Examples of Managing Backup Client Upgrades

In one embodiment, if and when a client is upgraded to support a new fingerprinting process, new fingerprints may not have been generated for data segments on the server side. A new fingerprint existence query at this point may result in a significant number of false positives even if the data segments exist in old backup images. Deduplication pools use a last image cache to perform client side deduplication. Therefore, after a client is upgrade to support the new fingerprinting process, the client side cache contains old fingerprints.

Consequently, when new fingerprints are generated for the data segments, old fingerprinting engine 115 also generates old fingerprints for the data segments. Deduplication engine 150 searches (or looks up) the old fingerprints in the fingerprint indexing cache and deduplicates redundant data. At the end of the ongoing backup, fingerprint mapping information between the old and new fingerprints for the data segments is sent to deduplication backup server 125.

Fingerprint mapping manager 140 then updates the fingerprint map file based on a mapping list (e.g., mapping list 245 maintained by fingerprint cache 130).

In some embodiments, deduplication backup server 125 determines that a new client computing device previously configured to use an old fingerprinting process has been configured to use a new fingerprinting process and receives a backup request from the new client computing device (e.g., where the backup request includes at least one data segment, and the backup request is received after the new client computing device has been configured to utilize the new fingerprinting process). Old fingerprinting engine 115 generates a first fingerprint for the data segment based on an old fingerprinting process, and new fingerprinting engine 120 generates a second fingerprint for the data segment based on the new fingerprinting process.

In other embodiments, deduplication engine 150 then performs a deduplication operation using the first fingerprint by using the first fingerprint to locate one or more redundant data blocks in the data segment in a last backup image cache (e.g., a last backup image cache that is associated with a previous backup image). Fingerprint mapping manager 140 then creates an entry in a fingerprint map file indicating an association between the first fingerprint and the second fingerprint after completion of the backup request.

Examples of Managing Restore Requests

In certain embodiments, if a client generates a restore request to restore a backup image with data objects containing old fingerprints, deduplication engine 150 first searches for the old fingerprints in a fingerprint map file and retrieves the corresponding new fingerprints. Deduplication backup server 125 then reads data segments based on the new fingerprints from the data container and returns the data to the client.

For example, in one embodiment, deduplication backup server 125 receives a restore request to restore a backup image that includes data objects that include fingerprints generated using an old fingerprinting process. Deduplication backup server 125 searches a fingerprint map file for the fingerprints, retrieves corresponding fingerprints generated using a new fingerprinting process, reads the data objects based on the new fingerprints, and restores the data objects as part of performing the restore request.

In some embodiments, if an old client requests restoration of data from a new backup image with data objects that include new fingerprints, fingerprint manager 135 maps old fingerprints to new fingerprints based on a container map file and transmits data to the old client, although the old client is configured to use an old fingerprinting process. Now when the old client wants to restore a backup image with data objects that include old fingerprints, fingerprint manager 135 searches the container map file for the old fingerprints, retrieves the corresponding new fingerprints (e.g., from fingerprint cache 130), reads data based on the new fingerprints, and transmits the data to the old client.

Example of an Accelerator Backup Service

In other embodiments, after an old client is upgraded to support a new fingerprinting process, the first accelerator backup after the upgrade will include no changed data from a backup image with a data object that contains old fingerprints. Instead, fingerprint manager 135 generates new fingerprints for the new data. However, to prevent a new backup image from including old fingerprints, deduplication backup server 125 converts old fingerprints to new fingerprints before sending a data object to a new client.

Therefore, in this manner, the methods, systems, and processes described herein provide a computing framework to handle fingerprinting process change in a deduplication backup system while facilitating seamless deduplication, backup, and restore operations without deduplication rate drop and business operation disruption.

Processes to Provide and Manage Backward Fingerprint Compatibility

Figure 4:
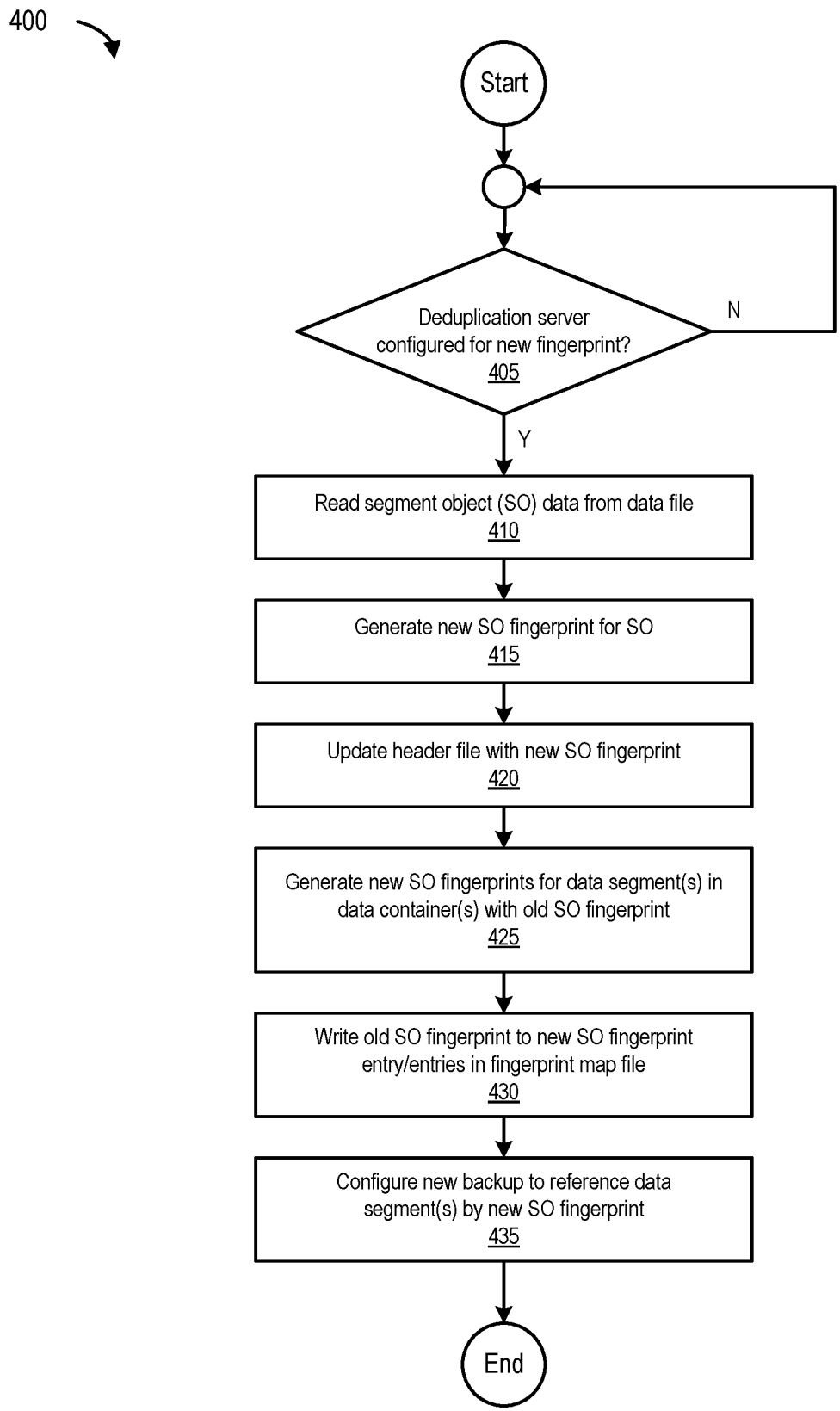
FIG. 4 is a flowchart 400 and illustrates a process for fingerprint backward compatibility, according to one embodiment of the present disclosure.

FIG. 4 is a flowchart 400 and illustrates a process for fingerprint backward compatibility that facilitates the co-existence of old and new clients with respect to old and new fingerprinting processes in a deduplication backup system, according to one embodiment. The process begins at 405 by determining if a deduplication server (e.g., deduplication backup server 125) is configured for a new fingerprint (e.g., a new fingerprinting process). If the deduplication server is not configured for a new fingerprint, the process loops back to 405. If the deduplication server is configured for the new fingerprint, the process, at 410, reads segment object (SO) data from a data file (e.g., data file 170(1)). At 415, the process generates a new SO fingerprint for the SO, and at 420, updates a header file with the new SO fingerprint (e.g., header file 165(1)).

At 425, the process generates new SO fingerprints for data segments in data containers with old SO fingerprints, and at 430, writes an old SO fingerprint to new SO fingerprint entry in a fingerprint map file (e.g., as shown in FIG. 3B). At 435, the process ends after configuring a new backup to reference data segments by the new SO fingerprints.

Figure 5:
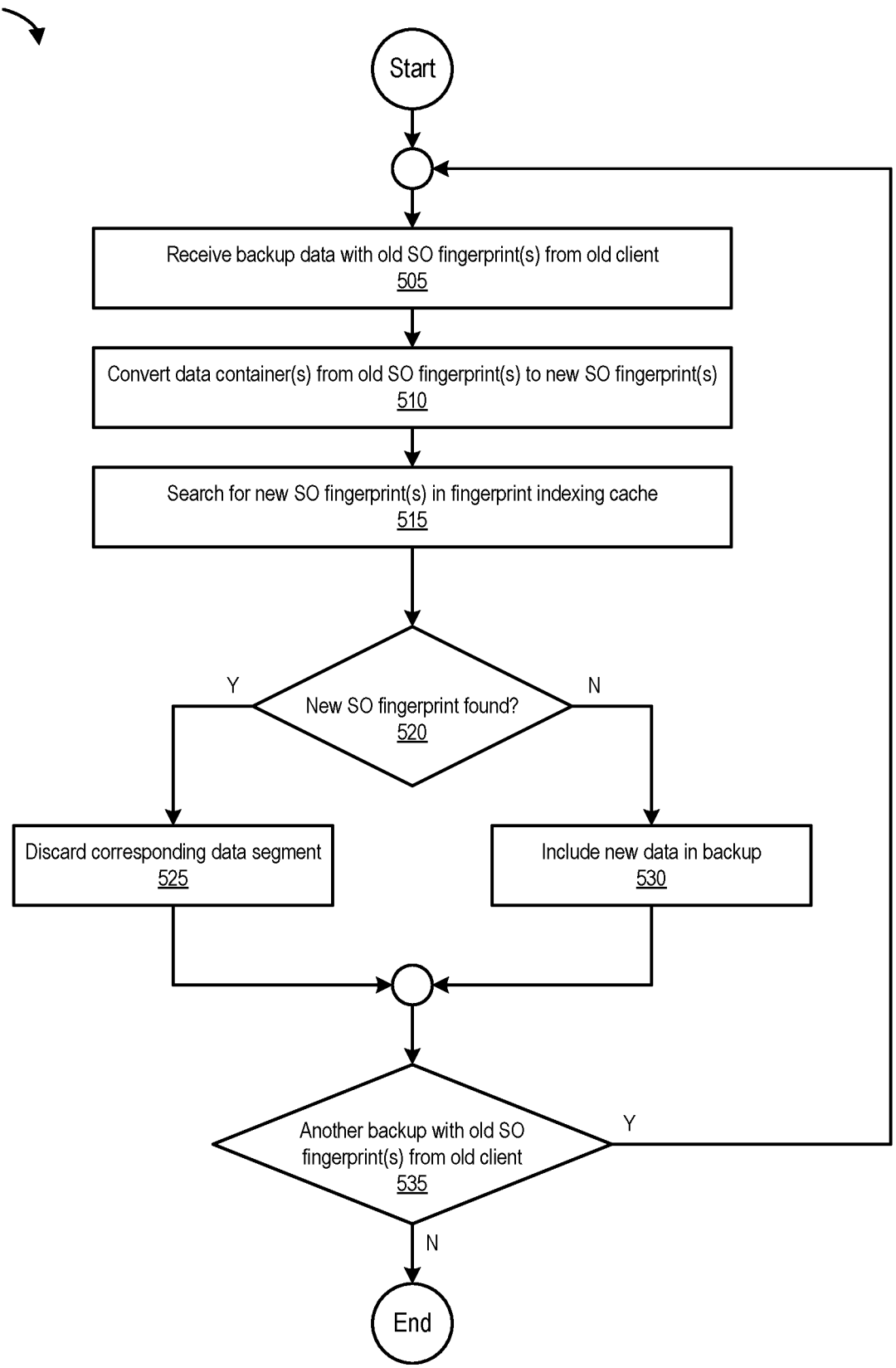
FIG. 5 is a flowchart 500 and illustrates a process for deduplicating and backing up data with old fingerprints, according to one embodiment of the present disclosure.

FIG. 5 is a flowchart 500 and illustrates a process for deduplicating and backing up data with old fingerprints, according to one embodiment. The process begins at 505 by receiving backup data with old fingerprints from an old client. At 510, the process converts data containers from old SO fingerprints to new SO fingerprints. At 515, the process searches for the new SO fingerprints in a fingerprint indexing cache.

At 520, the process determines whether the new SO fingerprint is found. If the new SO fingerprint is found, the process discards the corresponding data segment. However, if the new SO fingerprint is not found, the process includes new data in the backup. At 535, the process determines if there is another backup with old SO fingerprints from the old client. If there is another backup with old SO fingerprints from the old client, the process loops to 505. Otherwise, the process ends.

Figure 6:
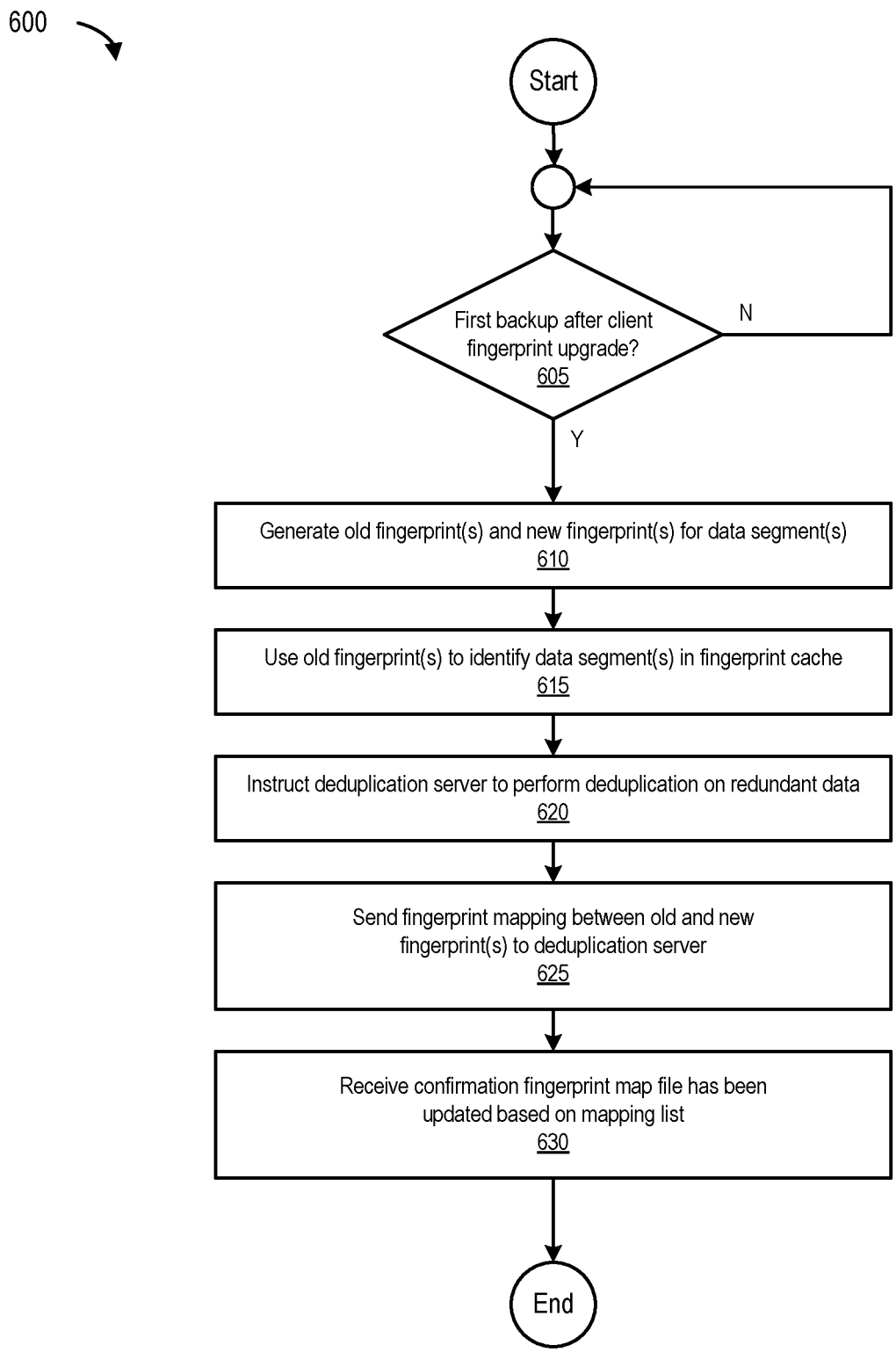
FIG. 6 is a flowchart 600 and illustrates a process for deduplicating and backing up data after a client fingerprint upgrade, according to one embodiment of the present disclosure.

FIG. 6 is a flowchart 600 and illustrates a process for deduplicating and backing up data after a client fingerprint upgrade, according to one embodiment. The process begins at 605 by determining if there is a first backup after a client fingerprint upgrade. If there is no first backup, the process loops to 605. However, if there is a first backup after a client fingerprint upgrade, the process, at 610, generates old fingerprints and new fingerprints for data segments, and at 615, uses the old fingerprints to identify data segments in a fingerprint cache.

At 620, the process instructs a deduplication server (e.g., deduplication backup server 125) to perform deduplication on redundant data, and at 625, sends fingerprint mapping (information) between the old and new fingerprints to the deduplication server. The process ends at 630 by receiving confirmation that the fingerprint map file has been updated based on a mapping list.

Figures 7A, 7B:
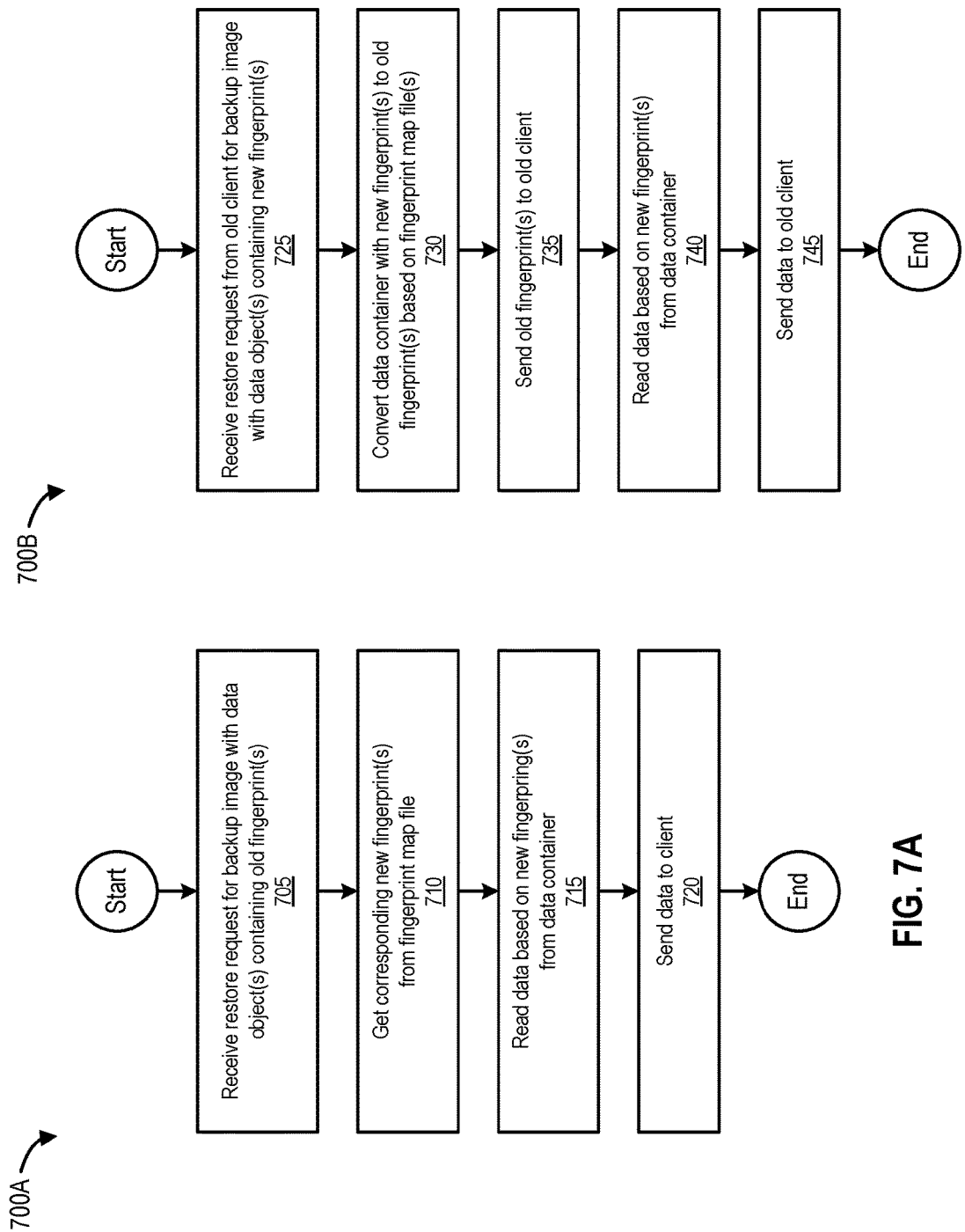
FIG. 7A is a flowchart 700A and illustrates a process for restoring data with old fingerprints, according to one embodiment of the present disclosure.
FIG. 7B is a flowchart 700B and illustrates a process for restoring data with new fingerprints, according to one embodiment of the present disclosure.

FIG. 7A is a flowchart 700A and illustrates a process for restoring data with old fingerprints, according to one embodiment. The process begins at 705 by receiving a restore request for a backup image with data objects containing old fingerprints (e.g., from a client). At 710, the process retrieves corresponding new fingerprints from a fingerprint map file. At 715, the process reads data based on the new fingerprints from a data container, and ends at 720 by sending the data to the client.

FIG. 7B is a flowchart 700B and illustrates a process for restoring data with new fingerprints, according to one embodiment. The process begins at 725 by receiving a restore request from an old client for a backup image with data objects containing new fingerprints. At 730, the process converts a data container with new fingerprints to old fingerprints based on fingerprint map files, and at 735, sends the old fingerprints to the old client. At 740, the process reads data based on the new fingerprints from the data container, and ends at 745 by sending the data to the old client.

Example Computing Environment

Figure 8:
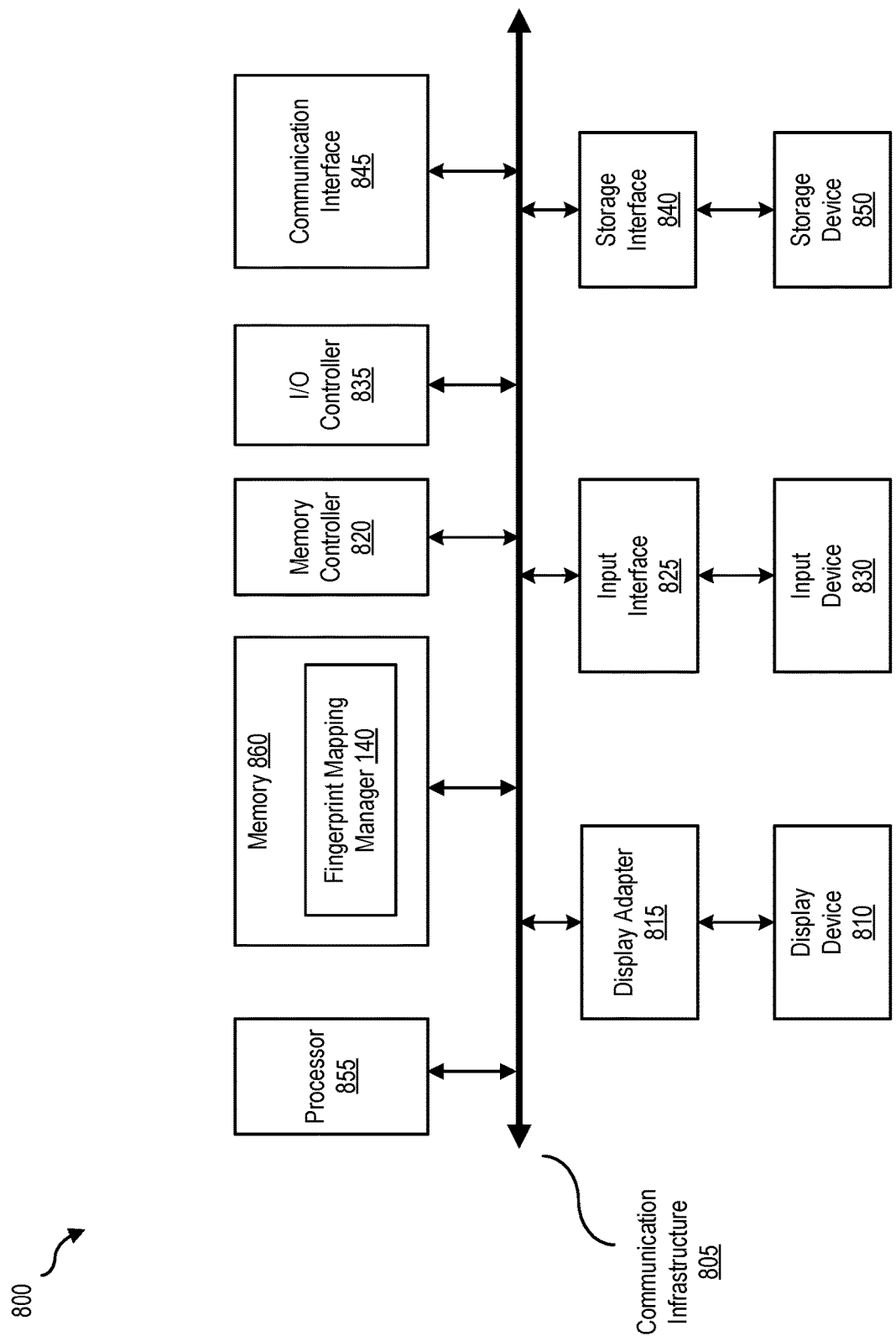
FIG. 8 is a block diagram of a computing system 800, according to one embodiment of the present disclosure.

FIG. 8 is a block diagram of a computing system 800, according to one embodiment of the present disclosure. Computing system 800 can include deduplication backup server 125 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes fingerprint mapping manager 140, computing system 800 becomes a special purpose computing device that is configured to optimize and manage fingerprint backward compatibility in deduplication backup systems.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing fingerprint mapping engine 140 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of an appliance and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in deduplication backup server 125 and/or deduplicated backup storage device 155. When executed by processor 855, a computer program loaded into computing system 800 may cause processor 855 to perform and/or be a means for performing the functions of one or more of the embodiments described/illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
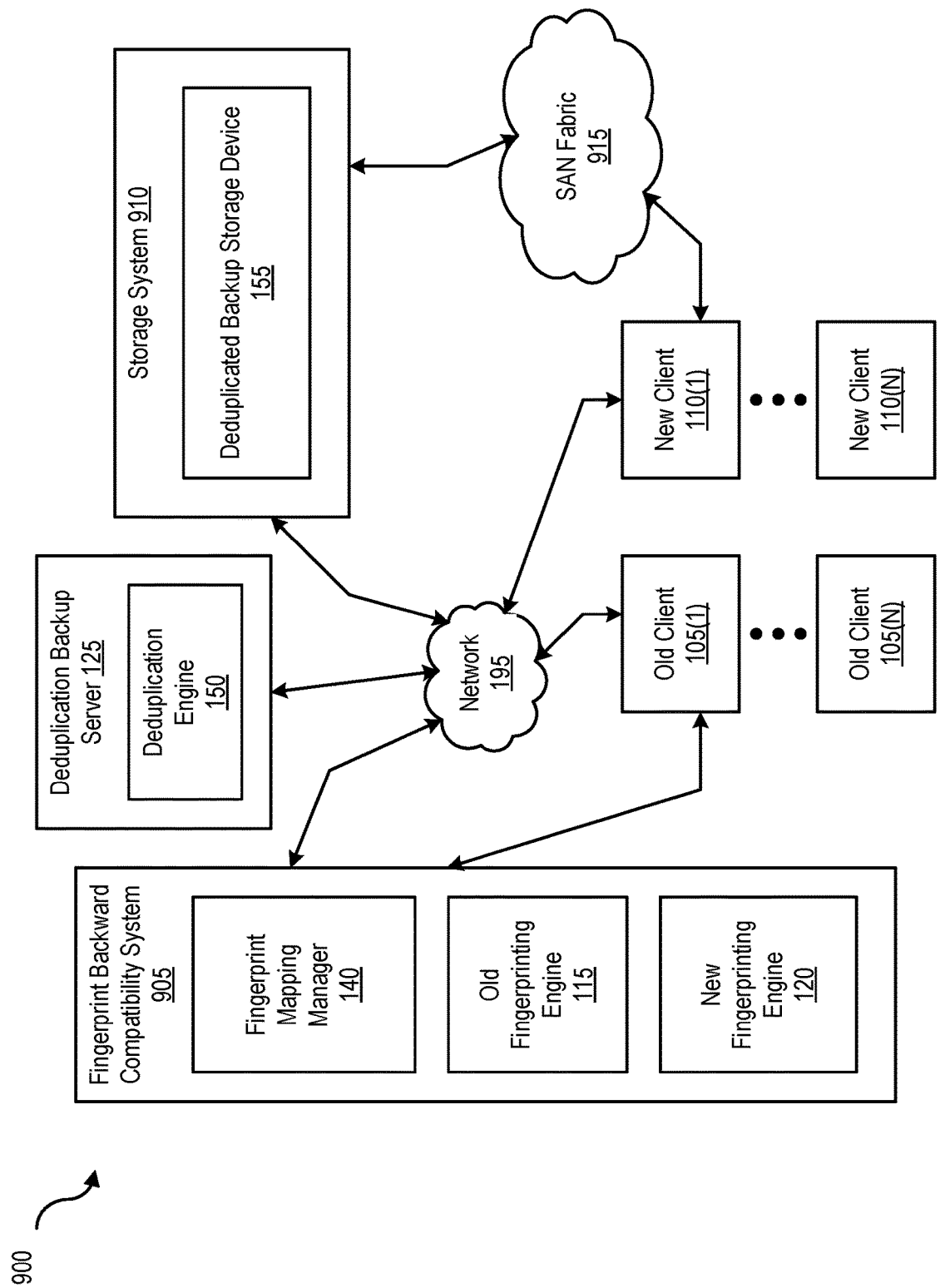
FIG. 9 is a block diagram of a networking system 900, according to one embodiment of the present disclosure.

FIG. 9 is a block diagram of a networked system, illustrating how various computing devices can communicate via a network, according to one embodiment. In certain embodiments, network-attached storage (NAS) devices may be configured to communicate with deduplication backup server 125 using Network File System (NFS), Server Message Block (SMB), or Common Internet File System (CIFS). Network 195 generally represents any type or form of computer network or architecture capable of facilitating communication between old clients 105(1)-(N), new clients 110(1)-(N), and/or deduplication backup server 125.

In certain embodiments, a communication interface, such as communication interface 845 in FIG. 8, may be used to provide connectivity between old clients 105(1)-(N), new clients 110(1)-(N), and/or deduplication backup server 125, and network 195. The embodiments described and/or illustrated herein are not limited to the Internet or any particular network-based environment. In some embodiments, network 195 can be a Storage Area Network (SAN). In other embodiments, fingerprint mapping manager 140 may be part of deduplication backup server 125, or may be separate. If separate, deduplication backup server 125 and the computing device fingerprint mapping engine is implemented in (e.g., fingerprint backward compatibility system 905) may be communicatively coupled via network 195.

In one embodiment, all or a portion of one or more of the disclosed embodiments may be encoded as a computer program and loaded onto and executed by deduplication backup server 125. All or a portion of one or more of the embodiments disclosed herein may also be encoded as a computer program, stored on deduplication backup server 125 or storage system 910, and distributed over network 195.

In some examples, all or a portion of deduplication backup server 125 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, fingerprint mapping manager 140 may transform the behavior of deduplication backup server 125 to optimize and manage fingerprint backward compatibility in deduplication systems. It should be noted that while the disclosure discusses different fingerprinting processes in terms of engines, such processes may be performed by the same fingerprinting engine in different forms, processes, modules, and the like.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
   receiving a backup request from a client computing device, wherein
   the backup request comprises
   a segment object comprising backup data,
   a determination has been made that the client computing device was previously configured to use an existing fingerprinting process and is now configured to use a new fingerprinting process, and
   the backup request is received after the client computing device has been configured to utilize the new fingerprinting process;
   determining whether an existing fingerprint has been generated for the segment object, wherein
   the segment object is stored in a data container, and
   the data container comprises a header file;
   in response to a determination that the existing fingerprint has not been generated for the segment object,
   generating the existing fingerprint, wherein
   the existing fingerprint is stored in the header file of the data container,
   the existing fingerprint is generated for the segment object by the existing fingerprinting process, and
   the existing fingerprinting process uses a first fingerprinting algorithm to generate the existing fingerprint;
   generating a new fingerprint for the segment object, wherein
   the new fingerprint is generated for the segment object by a new fingerprinting process, and
   the new fingerprinting process uses a second fingerprinting algorithm to generate the new fingerprint;
   in response to a determination that the existing fingerprint has been generated for the segment object,
   replacing the existing fingerprint in the header file of the data container by deleting the existing fingerprint in the header file of the data container and adding the new fingerprint to the header file of the data container; and
   creating an entry in a fingerprint map file, wherein
   the entry indicates an association between the existing fingerprint and the new fingerprint by virtue of comprising information regarding the existing fingerprint and information regarding the new fingerprint.

2. The computer-implemented method of claim 1, further comprising:
   receiving a request for one or more data segments, wherein
   the one or more data segments are part of a data object, and
   the data object references the existing fingerprint; and
   searching the fingerprint map file to locate the one or more data segments in a deduplicated backup storage device.

3. The computer-implemented method of claim 1, wherein
   the data container comprises
   a data file associated with the segment object, and
   the fingerprint map file.

4. The computer-implemented method of claim 2, wherein
   the data object is part of a backup image or a previous backup image, and
   the backup image, the previous backup image, and the data container are stored in the deduplicated backup storage device.

5. The computer-implemented method of claim 4, further comprising:

determining that a deduplication server comprises one or more binaries that support the new fingerprinting process; and converting one or more data containers storing the one or more data segments from the existing fingerprint to the new fingerprint.

6. The computer-implemented method of claim 5, further comprising:

receiving a backup request from an old client computing device, wherein the old client computing device is configured to use the existing fingerprinting process, and the backup request comprises at least one data segment that references a fingerprint generated using the existing fingerprinting process;

generating another fingerprint for the at least one data segment based on the new fingerprinting process;

searching for the another fingerprint in a fingerprint indexing cache;

inhibiting inclusion of the at least one data segment in the backup request if the another fingerprint is found in the fingerprint indexing cache; and including the at least one data segment in the backup request if the another fingerprint is not found in the fingerprint indexing cache.

7. The computer-implemented method of claim 1, further comprising;

determining that a new client computing device previously configured to use the existing fingerprinting process has been configured to use the new fingerprinting process;

receiving another backup request from the new client computing device, wherein the another backup request comprises at least another data segment, and the another backup request is received after the new client computing device has been configured to utilize the new fingerprinting process;

generating a first fingerprint for the at least another data segment based on the existing fingerprinting process; and generating a second fingerprint for the at least another data segment based on the new fingerprinting process.

8. The computer-implemented method of claim 7, further comprising:

performing a deduplication operation, wherein the backup data is part of a backup image or a previous backup image, the deduplication operation is performed using the first fingerprint, the first fingerprint locates one or more redundant data blocks in the at least another data segment in a last backup image cache, and the last backup image cache is associated with the previous backup image; and creating another entry in the fingerprint map file, wherein the another entry indicates another association between the first fingerprint and the second fingerprint after completion of the another backup request.

9. The computer-implemented method of claim 8, further comprising:

receiving a restore request to restore the backup image, wherein the backup image comprises one or more data objects, and the one or more data objects comprise one or more fingerprints generated using the existing fingerprinting process.

10. The computer-implemented method of claim 9, further comprising:

accessing the fingerprint map file;

searching the fingerprint map file for the one or more fingerprints;

retrieving one or more corresponding fingerprints generated using the new fingerprinting process;

reading the one or more data objects based on the one or more corresponding fingerprints; and restoring the one or more data objects as part of performing the restore request.

11. A non-transitory computer readable storage medium comprising program instructions executable to:

receive a backup request from a client computing device, wherein the backup request comprises a segment object comprising backup data, a determination has been made that the client computing device was previously configured to use an existing fingerprinting process and is now configured to use a new fingerprinting process, and the backup request is received after the client computing device has been configured to utilize the new fingerprinting process;

determine whether an existing fingerprint has been generated for the segment object, wherein the segment object is stored in a data container, and the data container comprises a header file;

in response to a determination that the existing fingerprint has not been generated for the segment object, generate the existing fingerprint, wherein the existing fingerprint is stored in the header file of the data container, the existing fingerprint is generated for the segment object by the existing fingerprinting process, and the existing fingerprinting process uses a first fingerprinting algorithm to generate the existing fingerprint;

generate a new fingerprint for the segment object, wherein the new fingerprint is generated for the segment object by a new fingerprinting process, and the new fingerprinting process uses a second fingerprinting algorithm to generate the new fingerprint;

in response to a determination that the existing fingerprint has been generated for the segment object, replace the existing fingerprint in the header file of the data container by deleting the existing fingerprint in the header file of the data container and adding the new fingerprint to the header file of the data container; and create an entry in a fingerprint map file, wherein the entry indicates an association between the existing fingerprint and the new fingerprint by virtue of comprising information regarding the existing fingerprint and information regarding the new fingerprint.

12. The non-transitory computer readable storage medium of claim 11, wherein the program instructions are further executable to:

receive a request for one or more data segments, wherein the one or more data segments are part of a data object, and the data object references the existing fingerprint; and search the fingerprint map file to locate the one or more data segments in a deduplicated backup storage device.

13. The non-transitory computer readable storage medium of claim 12, wherein
the data container comprises
a data file associated with the segment object, and the fingerprint map file,
the data object is part of a backup image or a previous backup image, and
the backup image, the previous backup image, and the data container are stored in the deduplicated backup storage device.

14. The non-transitory computer readable storage medium of claim 13, wherein the program instructions are further executable to:
determine that a deduplication server comprises one or more binaries that support the new fingerprinting process;
convert one or more data containers storing the one or more data segments from the existing fingerprint to the new fingerprint;
receive a backup request from an old client computing device, wherein
the old client computing device is configured to use the existing fingerprinting process, and
the backup request comprises at least one data segment that references a fingerprint generated using the existing fingerprinting process;
generate another fingerprint for the at least one data segment based on the new fingerprinting process;
search for the another fingerprint in a fingerprint indexing cache;
inhibit inclusion of the at least one data segment in the backup request if the another fingerprint is found in the fingerprint indexing cache; and
include the at least one data segment in the backup request if the another fingerprint is not found in the fingerprint indexing cache.

15. The non-transitory computer readable storage medium of claim 13, wherein the program instructions are further executable to:
determine that a new client computing device previously configured to use the existing fingerprinting process has been configured to use the new fingerprinting process;
receive another backup request from the new client computing device, wherein
the another backup request comprises at least another data segment, and
the another backup request is received after the new client computing device has been configured to utilize the new fingerprinting process;
generate a first fingerprint for the at least another data segment based on the existing fingerprinting process;
generate a second fingerprint for the at least another data segment based on the new fingerprinting process;
perform a deduplication operation, wherein
the deduplication operation is performed using the first fingerprint,
the first fingerprint locates one or more redundant data blocks in the at least another data segment in a last backup image cache, and
the last backup image cache is associated with the previous backup image; and
create another entry in the fingerprint map file, wherein
the another entry indicates another association between the first fingerprint and
the second fingerprint after completion of the another backup request; and
receive a restore request to restore the backup image, wherein
the backup image comprises one or more data objects, and
the one or more data objects comprise one or more fingerprints generated using the existing fingerprinting process.

16. A system comprising:
one or more processors; and
a memory coupled to the one or more processors, wherein the memory stores program instructions executable by the one or more processors to
receive a backup request from a client computing device, wherein
the backup request comprises
a segment object comprising backup data,
a determination has been made that the client computing device was previously configured to use an existing fingerprinting process and is now configured to use a new fingerprinting process, and
the backup request is received after the client computing device has been configured to utilize the new fingerprinting process,
determine whether an existing fingerprint has been generated for the segment object, wherein
the segment object is stored in a data container, and
the data container comprises a header file,
in response to a determination that the existing fingerprint has not been generated for the segment object,
generate the existing fingerprint, wherein
the existing fingerprint is stored in the header file of the data container,
the existing fingerprint is generated for the segment object by the existing fingerprinting process, and
the existing fingerprinting process uses a first fingerprinting algorithm to generate the existing fingerprint,
generate a new fingerprint for the segment object, wherein
the new fingerprint is generated for the segment object by a new fingerprinting process, and
the new fingerprinting process uses a second fingerprinting algorithm to generate the new fingerprint,
in response to a determination that the existing fingerprint has been generated for the segment object,
replace the existing fingerprint in the header file of the data container by deleting the existing fingerprint in the header file of the data container and adding the new fingerprint to the header file of the data container, and
create an entry in a fingerprint map file, wherein
the entry indicates an association between the existing fingerprint and the new fingerprint by virtue of comprising information regarding the existing fingerprint and information regarding the new fingerprint.

17. The system of claim 16, wherein the program instructions executable by the one or more processors are further executable by the one or more processors to:
receive a request for one or more data segments, wherein
the one or more data segments are part of a data object, and
the data object references the existing fingerprint; and
search the fingerprint map file to locate the one or more data segments in a deduplicated backup storage device.

18. The system of claim 17, wherein
the data container comprises
a data file associated with the segment object, and
the fingerprint map file,
the data object is part of a backup image or a previous backup image, and
the backup image, the previous backup image, and the data container are stored in the deduplicated backup storage device.

19. The system of claim 18, wherein the program instructions executable by the one or more processors are further executable by the one or more processors to:
determine that a deduplication server comprises one or more binaries that support the new fingerprinting process;
convert one or more data containers storing the one or more data segments from the existing fingerprint to the new fingerprint;
receive a backup request from an old client computing device, wherein
the old client computing device is configured to use the existing fingerprinting process, and
the backup request comprises at least one data segment that references a fingerprint generated using the existing fingerprinting process;
generate another fingerprint for the at least one data segment based on the new fingerprinting process;
search for the another fingerprint in a fingerprint indexing cache;
inhibit inclusion of the at least one data segment in the backup request if the another fingerprint is found in the fingerprint indexing cache; and
include the at least one data segment in the backup request if the another fingerprint is not found in the fingerprint indexing cache.

20. The system of claim 19, wherein the program instructions executable by the one or more processors are further executable by the one or more processors to:
determine that a new client computing device previously configured to use the existing fingerprinting process has been configured to use the new fingerprinting process;
receive another backup request from the new client computing device, wherein
the another backup request comprises at least another data segment, and
the another backup request is received after the new client computing device has been configured to utilize the new fingerprinting process;
generate a first fingerprint for the at least another data segment based on the existing fingerprinting process;
generate a second fingerprint for the at least another data segment based on the new fingerprinting process;
perform a deduplication operation, wherein
the deduplication operation is performed using the first fingerprint,
the first fingerprint locates one or more redundant data blocks in the at least another data segment in a last backup image cache, and
the last backup image cache is associated with the previous backup image; and
create another entry in the fingerprint map file, wherein
the another entry indicates another association between the first fingerprint and
the second fingerprint after completion of the another backup request; and
receive a restore request to restore the backup image, wherein
the backup image comprises one or more data objects, and
the one or more data objects comprise one or more fingerprints generated using the existing fingerprinting process.

* * * * *